United States Patent
Hiwara et al.

(10) Patent No.: US 9,209,479 B2
(45) Date of Patent: *Dec. 8, 2015

(54) NONAQUEOUS ELECTROLYTE SOLUTION AND LITHIUM SECONDARY BATTERY USING SAME

(75) Inventors: Akio Hiwara, Chiba (JP); Takashi Hayashi, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 1183 days.

This patent is subject to a terminal disclaimer.

(21) Appl. No.: 12/083,005

(22) PCT Filed: Oct. 12, 2006

(86) PCT No.: PCT/JP2006/320410
§ 371 (c)(1),
(2), (4) Date: Apr. 2, 2008

(87) PCT Pub. No.: WO2007/043624
PCT Pub. Date: Apr. 19, 2007

(65) Prior Publication Data
US 2009/0226808 A1    Sep. 10, 2009

(30) Foreign Application Priority Data

Oct. 12, 2005 (JP) ................. 2005-298105
Nov. 17, 2005 (JP) ................. 2005-333051

(51) Int. Cl.
*H01M 6/14* (2006.01)
*H01M 10/052* (2010.01)
(Continued)

(52) U.S. Cl.
CPC .......... *H01M 10/052* (2013.01); *H01G 9/038* (2013.01); *H01G 11/62* (2013.01);
(Continued)

(58) Field of Classification Search
CPC ......... H01M 6/14; H01M 6/16; H01M 6/168; H01M 2300/0017; H01M 2300/0025; H01M 2300/0034; H01M 2300/0037
USPC ......... 429/200, 344, 324, 325, 329, 330, 331, 429/336, 338
See application file for complete search history.

(56) References Cited

U.S. PATENT DOCUMENTS 6,033,809 A * 3/2000 Hamamoto et al. .......... 429/340
6,927,001 B1 * 8/2005 Hamamoto et al. .......... 429/332
(Continued)

FOREIGN PATENT DOCUMENTS

JP     7-240232 A      9/1995
JP    11-339850 A     12/1999
(Continued)

OTHER PUBLICATIONS

PCT/ISA/210.
(Continued)

*Primary Examiner* — Jane L Stanley
(74) *Attorney, Agent, or Firm* — Buchanan, Ingersoll & Rooney PC

(57) ABSTRACT

Disclosed is a nonaqueous electrolyte solution containing a sultone compound represented by the Formula 1 below (wherein $R_1$ to $R_4$ respectively represent a hydrogen, a fluorine, a hydrocarbon group with 1 to 12 carbon atoms that may contain fluorine atom(s), n represents an integer of 0 to 3, and when n is 2 or 3, the two or three $R_3$ groups are independent from each other and the two or three $R_4$ groups are independent from each other), and an ethylene carbonate having a hydrogen atom substituted by a fluorine atom. Also disclosed is a lithium secondary battery employing the nonaqueous electrolyte solution. This nonaqueous electrolyte solution does not cause an increase in the internal resistance of a nonaqueous electrochemical device and improves the lifespan characteristics of the device. The lithium secondary battery containing the nonaqueous electrolyte solution exhibits greatly improved cycle charge/discharge characteristics at high temperature, and has excellent charge/discharge load characteristics.

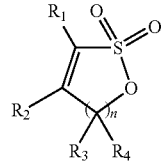

Formula 1

6 Claims, 3 Drawing Sheets

(51) Int. Cl.
  *H01M 6/16* (2006.01)
  *H01G 9/022* (2006.01)
  *H01G 11/62* (2013.01)
  *H01M 10/0567* (2010.01)
  *H01M 10/0569* (2010.01)

(52) U.S. Cl.
  CPC ............... *H01M 6/14* (2013.01); *H01M 6/16* (2013.01); *H01M 10/0567* (2013.01); *H01M 10/0569* (2013.01); *H01M 2300/0017* (2013.01); *H01M 2300/0037* (2013.01); *Y02E 60/122* (2013.01); *Y02E 60/13* (2013.01)

(56) References Cited

U.S. PATENT DOCUMENTS

| | | | |
|---|---|---|---|
| 7,491,471 B2 * | 2/2009 | Yamaguchi et al. | 429/337 |
| 2001/0053485 A1 * | 12/2001 | Shibuya et al. | 429/303 |
| 2003/0118914 A1 * | 6/2003 | Mori | 429/340 |
| 2004/0034253 A1 * | 2/2004 | Angell et al. | 568/6 |
| 2004/0197667 A1 | 10/2004 | Noh et al. | |
| 2005/0014072 A1 * | 1/2005 | Yamaguchi et al. | 429/329 |
| 2005/0130035 A1 * | 6/2005 | Inada et al. | 429/161 |
| 2005/0214646 A1 | 9/2005 | Kubota | |
| 2005/0287442 A1 * | 12/2005 | Kim et al. | 429/326 |
| 2008/0145752 A1 | 6/2008 | Hirose et al. | |
| 2008/0166637 A1 | 7/2008 | Inagaki et al. | |
| 2010/0018034 A1 | 1/2010 | Miyasaka et al. | |
| 2010/0194347 A1 | 8/2010 | Kubota | |
| 2011/0136006 A1 * | 6/2011 | Nogi et al. | 429/200 |

FOREIGN PATENT DOCUMENTS

| | | |
|---|---|---|
| JP | 3163078 B2 | 5/2001 |
| JP | 2002-329528 A | 11/2002 |
| JP | 2003-132946 A | 5/2003 |
| JP | 2003-151623 A | 5/2003 |
| JP | 2003-157900 A | 5/2003 |
| JP | 2004-47131 A | 2/2004 |
| JP | 2004-63145 A | 2/2004 |
| JP | 2004-071159 A | 3/2004 |
| JP | 2004-087168 A | 3/2004 |
| JP | 2004-171981 A | 6/2004 |
| JP | 2004-172101 A | 6/2004 |
| JP | 2004342607 A * | 12/2004 ............ H01M 10/40 |
| JP | 2005-50808 A | 2/2005 |
| JP | 2005-100851 A | 4/2005 |
| JP | 2005-108440 A | 4/2005 |
| JP | 2005-235734 A | 9/2005 |
| JP | 2006-294519 A | 10/2006 |
| JP | 2007-165296 A | 6/2007 |
| JP | 2007-173113 A | 7/2007 |
| JP | 2007-207723 A | 8/2007 |
| WO | WO 2007/043624 A1 | 4/2007 |
| WO | WO 2008/032657 A1 | 3/2008 |

OTHER PUBLICATIONS

PCT/ISA/237.
Office Action from Japanese Patent Office issued in corresponding Japanese Patent Application No. 2007-539986 dated Apr. 26, 2011, with an English translation.
International Search Report (PCT/ISA/210) issued on Nov. 2, 2009, by the Japanese Patent Office as the International Searching Authority for International Patent Application No. PCT/JP2009/063873.
Written Opinion (PCT/ISA/237) issued on Nov. 2, 2009, by the Japanese Patent Office as the International Searching Authority for International Patent Application No. PCT/JP2009/063873.
Extended European Search Report dated Feb. 25, 2013, issued in European Application No. 09805003.2. (5 pages).
Office Action dated Jan. 25, 2013, issued in Korean Patent Application No. 10-2011-7003040 with an English translation.
Office Action (The Second Notification of Examination Opinion) issued by the Chinese Patent Office on Nov. 8, 2013, in the Chinese Patent Application No. 200980130892.4 and an English translation of the Official Action. (7 pages).

* cited by examiner

NONAQUEOUS ELECTROLYTE SOLUTION AND LITHIUM SECONDARY BATTERY USING SAME

TECHNICAL FIELD

The present invention relates to a nonaqueous electrolyte solution that improves lifespan characteristics of nonaqueous electrochemical elements such as a lithium secondary battery. It also relates to a lithium secondary battery that employs the electrolyte solution, and has excellent charge/discharge cycle characteristics in high temperature conditions and has excellent charge/discharge performances.

BACKGROUND ART

A lithium secondary battery is characterized by its high energy density and is a battery composed of: a negative electrode of an active material capable of storing/releasing lithium metal or lithium ions; a positive electrode of an active material capable of storing/releasing lithium ions or anions; a nonaqueous electrolyte solution; and the like. Further, such characteristics as high output and longer operating life due to the capability for repeated charging/discharging a considerable number of times, have been attracting attention.

Lithium secondary batteries are already mainly employed as the secondary batteries for use in portable devices, such as compact video cameras, cellular phones and notebook computers, due to their high energy density characteristics. In addition, intensive research is being carried out into applications of such batteries as a power source for energy regeneration in hybrid type electric cars, night storage electric power systems, and the like, due to their characteristics of high output and long operating life. In view of these circumstances, further enhancements of the energy density, output and operating life are still desired.

In order to increase the energy density of lithium secondary batteries, a method of increasing the packing density of active materials in a battery is generally adopted. In such cases, the amount of an electrolyte solution impregnated into pores in the electrodes will be inevitably reduced, and therefore a lowering of the operating life of the battery tends to occur, due to the smaller amount of the electrolyte solution. Furthermore, in applications such as hybrid electric cars and night storage electric power systems, an operating life of several years or longer is required. Based on the above reasons, an electrolyte solution is desired that will further improve the operating life and enhance the charge/discharge performance of a battery.

Towards these aims, the addition of various kinds of additives has been considered as measures for improving the lifespan characteristics of a battery. For example, there is proposed adding a sultone compound having a double bond at a specified site to a nonaqueous electrolyte solution (for example, Japanese Patent Application Laid-Open (JP-A) No. 2002-329528). In this case, however, although there is a large effect for improving the operating life of the battery, there is a fear that the internal resistance of a battery will be increased, lowering the charge/discharge load characteristics thereof. There is also proposed adding fluoroethylene carbonate to a nonaqueous electrolyte solution (for example, JP-A No. 7-240232 and JP-A No. 2004-47131). In this case, however, although there is only a small risk that the internal resistance of the battery will be increased, there is a fear that there will be little improvement in the charge/discharge cycle characteristics at high temperature. There is also a proposal to add vinylene carbonate to a nonaqueous electrolyte solution. In this case, however, the effect of improving the lifespan characteristics of a battery at high temperature will not be satisfactory, even though the possibility of increasing the internal resistance of the battery is small.

Patent document 1: JP-A No. 2002-329528
Patent document 2: JP-A No. 7-240232
Patent document 3: JP-A No. 2004-47131

DISCLOSURE OF THE INVENTION

The purpose of the present invention is to provide a nonaqueous electrolyte solution that gives excellent charge/discharge cycle characteristics of an electrochemical element at high temperature, and causes no problem in charge/discharge load characteristics, by suppressing the increase in the internal resistance of the electrochemical element that occurs when a sultone compound having a double bond at a specified site is employed.

With the view of the above purpose, the present inventors have made intensive studies and, as a result, completed the present invention.

That is, the invention relates to:

1. A nonaqueous electrolyte solution comprising a nonaqueous solvent, an electrolyte, a sultone compound represented by the Formula 1 below, and an ethylene carbonate having a hydrogen atom substituted by a fluorine atom, Formula 1 wherein, in Formula 1: $R_1$ to $R_4$ each independently represent a hydrogen atom, a fluorine atom, or a hydrocarbon group with 1 to 12 carbon atoms that may contain fluorine atom(s); n represents an integer of 0 to 3; and when n is 2 or 3, the two or three $R_3$ groups are independent from each other and two or three $R_4$ groups are independent from each other.

(2) the nonaqueous electrolyte solution as described in above (1), wherein the sultone compound is 1,3-prop-1-ene sultone and/or methyl-1,3-prop-1-ene sultone;

(3) the nonaqueous electrolyte solution as described in above (1) or (2), wherein the ethylene carbonate having a hydrogen atom substituted by a fluorine atom is 4-fluoroethylene carbonate and/or 4,5-difluoroethylene carbonate;

(4) the nonaqueous electrolyte solution as described in any of above (1) to (3), further containing a cyclic carbonate having a carbon-carbon unsaturated bond at from 0.01 to 1 weight %;

(5) the nonaqueous electrolyte solution as described in any of above (1) to (4), further containing a silyl phosphate at from 0.01 to 2 weight %; and (6) a lithium secondary battery comprising the nonaqueous electrolyte solution as described in any of above (1) to (5).

Effect of the Invention

By employing the nonaqueous electrolyte solution of the invention, having excellent charge/discharge cycle characteristics particularly in high temperature conditions, and having no problem in charge/discharge load characteristics, a lithium battery having a higher capacity and a longer operating life can be obtained, as compared with conventional nonaqueous electrolyte solutions.

BEST MODE FOR CARRYING OUT THE INVENTION

The nonaqueous electrolyte solution of the present invention contains a specified sultone compound and an ethylene carbonate having a hydrogen atom substituted by a fluorine atom.

Sultone Compound

The sultone compound according to the invention is represented by the Formula 1 below, Formula 1 wherein, in Formula 1: $R_1$ to $R_4$ each independently represent a hydrogen atom, a fluorine atom, or a hydrocarbon group with 1 to 12 carbon atoms that may contain fluorine atom(s); n represents an integer of 0 to 3; and when n is 2 or 3, the two or three $R_3$ groups are independent from each other and two or three $R_4$ groups are independent from each other.

The sultone compound represented by Formula 1 is preferable since it forms a protective film that prevents shortening of the operating life on the surface of the electrode of a nonaqueous electrochemical element, when employed as a nonaqueous electrolyte solution.

In the formula, various compounds can be mentioned as the hydrocarbon group having 1 to 12 carbon atoms that may contain fluorine atom(s), and specific examples thereof include a methyl group, ethyl group, vinyl group, ethynyl group, propyl group, isopropyl group, 1-propenyl group, 2-propenyl group, 1-propinyl group, 2-propinyl group, butyl group, sec-butyl group, t-butyl group, 1-butenyl group, 2-butenyl group, 3-butenyl group, 2-methyl-2-propenyl group, 1-methylenepropyl group, 1-methyl-2-propenyl group, 1,2-dimethyl vinyl group, 1-butynyl group, 2-butynyl group, 3-butynyl group, pentyl group, 1-methylbutyl group, 2-methylbutyl group, 3-methylbutyl group, 1-methyl-2-methylpropyl group, 2,2-dimethylpropyl group, phenyl group, methylphenyl group, ethylphenyl group, vinylphenyl group, ethynylphenyl group, hexyl group, cyclohexyl group, heptyl group, octyl group, nonyl group, decyl group, undecyl group, dodecyl group, difluoromethyl group, monofluoromethyl group, trifluoromethyl group, trifluoroethyl group, difluoroethyl group, pentafluoroethyl group, pentafluoropropyl group, tetrafluoropropyl group, perfluorobutyl group, perfluoropentyl group, perfluorohexyl group, perfluorocyclohexyl group, perfluoroheptyl group, perfluorooctyl group, perfluorononyl group, perfluorodecyl group, perfluoroundecyl group, perfluorododecyl group, fluorophenyl group, difluorophenyl group, trifluorophenyl group, perfluorophenyl group, trifluoromethylphenyl group, naphthyl group and biphenyl group. Among these, the number of the carbon atoms in the hydrocarbon group that may contain a fluorine atom is desirably 4 or less and more desirably 2 or less, from the standpoint of solubility in the electrolyte solution.

Further, in Formula 1, any integers of 0 to 3 for n may be effective, but is desirably 1 or 2, and most desirably 1.

As the sultone compound according to the invention, specific compounds as below can be mentioned.

The most desirable compounds among the above-described compounds are the sultone compounds represented by Formula 1 in which all of the groups $R_1$ to $R_4$ are hydrogen atoms, or one of the groups $R_1$ to $R_4$ is a methyl group, and n is 1. Specifically, the 1,3-prop-1-ene sultone and/or the methyl-1,3-prop-1-ene sultone are most preferable. Examples of the methyl-1,3-prop-1-ene sultone include 1-methyl-1,3-prop-1-ene sultone, 2-methyl-1,3-prop-1-ene sultone and 3-methyl-1,3-prop-1-ene sultone. From the standpoint of readily producing the compound, 2-methyl-1,3-prop-1-ene sultone is desirable. Further, 1,3-prop-1-ene sultone is most desirable from the standpoint of improving the lifespan characteristics. When this compound is used, the ratio of organic materials (hydrocarbons) in the protective film formed on the surface of the electrode is at the minimum level and the composition is most inorganic, and therefore the effect of suppressing the lifespan shortening of an electrochemical element is at the highest level.

Ethylene Carbonate Having a Hydrogen Atom Substituted by a Fluorine Atom

Various kinds of known compounds can be mentioned as the ethylene carbonate having a hydrogen atom substituted by a fluorine atom according to the invention, and specific examples thereof include 4-fluoroethylene carbonate, 4,4-difluoroethylene carbonate, cis-4,5-difluoroethylene carbonate, trans-4,5-difluoroethylene carbonate, 4,4,5-trifluoroethylene carbonate and 4,4,5,5-tetrafluoroethylene carbonate. It is less desirable when the ethylene carbonate has a higher substitution ratio of hydrogen atoms by fluorine atoms, since the thermal stability thereof tends to be lower. Further, when the compound has a higher substitution ratio of hydrogen atoms by fluorine atoms, the effect of suppressing the increase in the internal resistance of a battery becomes higher. On the other hand, although the reason is not clear, the effect of suppressing lifespan shortening of the protective film on the surface of an electrode becomes lower. Considering the above in a comprehensive manner, among these compounds, 4-fluoroethylene carbonate and/or 4,5-difluoroethylene carbonate are most desirable. The ethylene carbonate having a hydrogen atom substituted by a fluorine atom may be used alone or two or more kinds in combination.

Nonaqueous Solvent

The nonaqueous electrolyte solution of the invention contains a nonaqueous solvent. In the invention, the nonaqueous solvent is defined as one that does not include the above-described ethylene carbonate having a hydrogen atom substituted by a fluorine atom. As the nonaqueous solvent, various kinds of known ones suitable for respective nonaqueous electrochemical elements can be employed. As for lithium batteries and electric double layer capacitors, the esters are favorably chosen. In addition, sulfones, phosphoric acid esters, carbamates, ethers, ureas, amides, sulfonic acid esters and the like are also be applicable.

Among these, those composed of a cyclic ester or a chain ester are usually preferred. The cyclic ester or the chain ester may consist of a single kind of compound, or may be a mixture of multiple kinds of compounds. In such cases, multiple kinds of cyclic esters alone, multiple kinds of chain esters alone, or multiple kinds of both cyclic esters and chain esters, may be used in combination.

The nonaqueous solvent is preferably a mixture of a cyclic ester and a chain ester, because the ionic conductivity of the electrolyte solution can be enhanced and the properties of a lithium battery can be improved, and is particularly preferably a mixture of a cyclic carbonate and a chain carbonate, having a favorable electrochemical stability.

Specific examples of the cyclic esters include ethylene carbonate, 1,2-propylene carbonate, 1,2-butylene carbonate, 2,3-butylene carbonate and γ-butyrolactone. In particular, ethylene carbonate and propylene carbonate, having an excellent electrochemical stability and a high dielectric constant, are suitably employed. In the case of a battery containing a graphitic material as a negative electrode active material, ethylene carbonate is particularly preferable.

Specific examples of the chain esters include dimethyl carbonate, diethyl carbonate, ethyl methyl carbonate, methyl propyl carbonate, methyl isopropyl carbonate, dipropyl carbonate, methyl butyl carbonate, dibutyl carbonate, methyl trifluoroethyl carbonate, ditrifluoroethyl carbonate, ethyl trifluoroethyl carbonate, ethyl acetate, methyl propionate and ethyl propionate. In particular, dimethyl carbonate, methyl ethyl carbonate, diethyl carbonate and methyl propionate, which have a low viscosity and excellent electrochemical stability, are suitably used.

The mixing ratio of the cyclic ester and the chain ester in a nonaqueous solvent can be appropriately selected, but the ratio of cyclic ester:chain ester when denoted by weight ratio is preferably 10:90 to 70:30, particularly preferably 20:80 to 60:40, from the standpoint of improving charge/discharge load characteristics of a lithium battery. When the weight ratio is in the above range, the viscosity of an electrolyte solution can be decreased and the degree of dissociation of the electrolyte can be increased, and therefore the ionic conductivity of the electrolyte solution can be increased and the charge/discharge load characteristics of a battery can be improved. Further, from the standpoint of improving the safety such as preventing combustion of a lithium battery, the solvent desirably has a higher flash point. In this case, as a nonaqueous solvent, only the cyclic ester(s) may be used independently, or the content of the chain ester(s) may be limited to less than 30% by weight ratio, with respect to the whole nonaqueous solvent.

Electrolyte

The nonaqueous electrolyte solution of the invention contains an electrolyte. As the electrolyte, various kinds of known ones suitable for respective nonaqueous electrochemical elements can be employed. For use in lithium batteries, lithium salts are suitably selected, and for use in electric double layer capacitors, salts having an organic cation such as a tetraalkylammonium ion as a counter ion are suitably selected.

In cases where a nonaqueous electrolyte solution is used for lithium batteries, a lithium salt is employed as the electrolyte, and publicly known ones that are soluble in an organic solvent can be used. Specific examples thereof include lithium salts such as $LiPF_6$, $LiBF_4$, $LiClO_4$, $LiAsF_6$, $Li_2SiF_6$, $LiOSO_2Rf$, $LiPF_nRf_{(6-n)}$ (n is an integer of 0 to 6), $LiBF_nRf_{(4-n)}$ (n is an integer of 0 to 4), $LiC(SO_2Rf)_3$, $LiN(SO_2ORf)_n(SO_2Rf)_{(n-2)}$ (n is an integer of 0 to 2) and $LiN(SO_2F)_n(SO_2Rf)_{(n-2)}$ (n is an integer of 0 to 2) (in all of the above formulae, Rf represents perfluoroalkyl group(s) having 1 to 8 carbon atoms, which may be the same or different from each other).

Among these, $LiPF_6$, $LiBF_4$, $LiN(SO_2CF_3)_2$ and $LiN(SO_2C_2F_5)_2$ are preferable, since they have a high degree of ionic dissociation to cause a high ionic conductivity in an electrolyte solution. Further, $LiPF_6$ is most preferable because of a particularly high degree of corrosion resistance of the exterior metal of batteries and particularly high ionic conductivity.

These lithium salts may be used alone or in combination of two or more kinds. Examples of the combination of two or more kinds of electrolytes include: $LiPF_6$ and $LiBF_4$; $LiPF_6$ and $LiN(SO_2CF_3)_2$; $LiPF_6$ and $LiN(SO_2C_2F_5)_2$; $LiBF_4$ and $LiN(SO_2CF_3)_2$; $LiPF_6$ and $LiN(SO_2C_2F_5)_2$; $LiPF_6$, $LiBF_4$ and $LiN(SO_2CF_3)_2$; and $LiPF_6$, $LiBF_4$ and $LiN(SO_2C_2F_5)_2$. Among these, the combination that includes $LiPF_6$ and $LiBF_4$ at the same time is preferable from the standpoint of improving the lifespan characteristics of lithium batteries.

Nonaqueous Electrolyte Solution

The nonaqueous electrolyte solution of the invention contains the above-described sultone compound, ethylene carbonate having a hydrogen atom substituted by a fluorine atom, an electrolyte and nonaqueous solvent. As the nonaqueous solvent and electrolyte salt, those suitable for use in an electrolyte solution for lithium batteries among the above-described are used.

Since the nonaqueous electrolyte solution of the invention contains the above-described sultone compound and ethylene carbonate having a hydrogen atom substituted by a fluorine atom as essential components, the charge/discharge cycle characteristics at high temperature can be synergistically enhanced, and little problem is caused in the charge/discharge load characteristics.

The causes for such effects are not necessarily clear, but it can be considered as follows. The above-described sultone compound exerts the effect of forming a protective film that prevents lifespan shortening on the surface of an electrode of a nonaqueous electrochemical element. However, this protective film contains a large amount of inorganic ingredients. Consequently, although the resistance properties of the film against the nonaqueous electrolyte solution are sufficient even in high temperature conditions, there is a fear that the ionic conductivity will be insufficient. The ethylene carbonate having a hydrogen atom substituted by a fluorine atom also forms a protective film. However, this protective film contains a large amount of organic ingredients. Consequently, although problems in ionic conductivity are not many, the resistance properties against the nonaqueous electrolyte solution consisting mainly of an organic solvent are not sufficient in high temperature conditions. Accordingly, when both of them are contained in the protective film at the same time, shortcomings of each other can be mutually compensated, and therefore a protective film having excellent resistance properties against the nonaqueous electrolyte solution and having little problem in ionic conductivity can be formed on the electrode. As a result, it is considered that an electrolyte solution can be obtained having unprecedented levels of synergistically enhanced charge/discharge cycle characteristics in high temperature conditions, and having little problem in charge/discharge load characteristics.

The content of the above-described sultone compound in the nonaqueous electrolyte solution of the invention is from 0.01 weight % to 10 weight % with respect to the total amount of the nonaqueous electrolyte solution, preferably from 0.05 weight % to 5 weight %, further preferably from 0.1 weight % to 3 weight %. When the content of the sultone compound in the nonaqueous electrolyte solution is too small, the aforementioned effects may not be expressed. On the other hand, when the above content is too large, the above effects may become saturated and the increase in the internal resistance of a battery may be exaggerated, and therefore the risk of lowering the charge/discharge load characteristics may be increased.

The content of the ethylene carbonate having a hydrogen atom substituted by a fluorine atom in the nonaqueous electrolyte solution of the invention is from 0.01% by weight to 50% by weight, preferably form 0.05% by weight to 30% by weight, and further preferably from 0.1% by weight to 5% by weight, with respect to the total amount of the nonaqueous electrolyte solution. When the content of the ethylene carbonate having a hydrogen atom substituted by a fluorine atom is too small, the above-described effects may not be obtained. On the other hand, when the content thereof is too large, problems such as saturation of the effects or increase in the amount of decomposition gas at the time of storing at high temperature may be caused.

The content ratio of the sultone compound and the ethylene carbonate having a hydrogen atom substituted by a fluorine atom according to the invention is from 1:99 to 99:1, preferably from 5:95 to 80:20, and further preferably from 10:90 to 70:30 in terms of weight ratio. By determining the ratio within the aforementioned suitable range, the effect of the sultone compound to improve charge/discharge cycle characteristics under high temperature conditions can be further improved, and the increase in the internal resistance of a battery due to the sultone compound can be suppressed. Consequently, the lithium secondary battery employing the nonaqueous electrolyte solution of the invention exhibits excellent charge/discharge cycle characteristics particularly in high temperature conditions, while having little problem in charge/discharge load characteristics.

The concentration of the lithium electrolyte in the nonaqueous electrolyte solution is, usually, from 0.1 to 3 mol/l. From the standpoint of the ionic conductivity and increase in the viscosity of the electrolyte solution, the lithium electrolyte is desirably contained in the nonaqueous electrolyte solution at the concentration of preferably from 0.5 to 2 mol/l.

The nonaqueous electrolyte solution of the invention may contain a cyclic carbonate having a carbon-carbon unsaturated bond, in addition to the aforementioned basic composition. In such cases, it is further preferable since the effect of further improving the action of suppressing lifespan shortening of an electrochemical element can be obtained. As cyclic carbonates having a carbon-carbon double bond, various publicly known ones can be mentioned, and specific examples thereof include vinylene carbonate, methylvinylene carbonate, dimethylvinylene carbonate, ethylvinylene carbonate, phenylvinylene carbonate, diphenylvinylene carbonate, vinylethylene carbonate, 1-ethyl-1-vinylethylene carbonate and divinylethylene carbonate. Among these, when considering both the action of improving charge/discharge cycle characteristics in high temperature conditions and the effect on charge/discharge load characteristics of a nonaqueous electrolyte solution, vinylene carbonate, vinylethylene carbonate and divinylethylene carbonate are more desirable, and vinylethylene carbonate is most desirable.

The content of the cyclic carbonate having a carbon-carbon double bond in the nonaqueous electrolyte solution is, usually, from 0.01 to 5 weight %. When the content of the cyclic carbonate is too large, the improvement in the charge/discharge load characteristics achieved by the ethylene carbonate having a hydrogen atom substituted by a fluorine atom, which had been lowered by the sultone compound, may be lost. From the standpoint of further improving the charge/discharge cycle characteristics at high temperature, without affecting the action of restoring the lowered charge/discharge load characteristics, the content of the cyclic carbonate having a carbon-carbon unsaturated bond is desirably from 0.01 to 1 weight %, and further desirably from 0.05 to 0.5 weight %.

The nonaqueous electrolyte solution of the invention may include other additive(s) as necessary, in such a range that the purpose of the invention is not impaired.

Examples of other additives include sulfuric acid esters, boric acid esters, silyl esters, acid anhydrides, boric acid ester-based lithium salts and phosphoric acid ester-based lithium salts. Examples of the sulfuric acid ester include 1,3-propane sultone, 1,4-butane sultone, ethylene glycol di(methanesulfonic acid)ester, ethylene sulfite, propylene sulfite, ethylene sulfate, propylene sulfate, pentene sulfate, dimethyl meta-benzenesulfonate, diethyl sulfate and dimethyl sulfate. Examples of the boric acid ester include triethyl borate, tributyl borate, tris(trifluoroethyl) borate, tripropargyl borate and trimethylene borate. Examples of the silyl ester include silyl phosphates represented by tris(trimethylsilyl) phosphate, tris(trimethylsilyl) borate, trimethylsilyl ethanesulfonate, trimethylsilyl allylsulfonate and di(trimethylsilyl) sulfate. Examples of the acid anhydride include methane sulfonic anhydride, benzenesulfonic anhydride, p-toluenesulfonic anhydride, sulfobenzoic anhydride, succinic anhydride, maleic anhydride, glycolic anhydride and norbornenedicarboxylic anhydride. Examples of the boric acid ester-based lithium salt or phosphoric acid ester-based lithium salt include lithium bis(oxalato)borate, lithium difluoro(oxalato) borate, lithium bis(oxalato)fluorophosphate and lithium trifluoro(oxalato)phosphate. Among these additives, when considering totally the effects on charge/discharge cycle characteristics at high temperature and charge/discharge load characteristics, silyl esters such as silyl phosphates and tris (trimethylsilyl)borate are desirable. In particular, silyl phosphates are most desirable because they can improve charge/discharge load characteristics, and are desirably contained in the nonaqueous electrolyte solution at an amount of from 0.01 to 2 weight %.

The aforementioned additive(s) may be added at an amount within the range that the purpose of the invention is not impaired, and, for example, may be added at from 0.01 to 10 weight % in total with respect to the whole nonaqueous electrolyte solution. However, if too much of these additive(s) is added in the nonaqueous electrolyte solution of the invention, the resistance of a battery might be increased and the charge/discharge cycle characteristics might be lowered, contrary to expectation. Therefore, the content of the additive(s) is desirably from 0.01 to 2 weight %.

The nonaqueous electrolyte solution of the invention can be employed for various nonaqueous electrochemical elements. For example, it can be used as an electrolyte solution for lithium secondary batteries, an electrolyte solution for polymer lithium batteries in which the electrolyte solution is gelled with polymer, an electrolyte solution for lithium primary batteries, an electrolyte solution for electric double layer capacitors, an electrolyte solution for electrochemical capacitors, an electrolyte solution for aluminum electrolytic condensers, an electrolyte solution for organic solar batteries such as the Graetzel cell, and an electrolyte solution for electrochromism cells. Among these, it is suitably used as an electrolyte solution for lithium secondary batteries.

Lithium Secondary Battery

The lithium secondary battery of the invention is a lithium secondary battery that contains the nonaqueous electrolyte solution of the invention, and other constituents thereof are not particularly limited. Usually, the lithium secondary battery of the invention contains the nonaqueous electrolyte solution, a negative electrode, a positive electrode and a separator as fundamental constitutional components. Since the lithium secondary battery of the invention contains the nonaqueous electrolyte solution of the invention, it exhibits excellent charge/discharge cycle characteristics at high temperature, and excellent charge/discharge load characteristics as well.

The negative electrode contains a negative electrode active material, and one used in ordinary lithium secondary batteries may be employed. As the negative electrode active material, for example, any of carbonaceous materials capable of doping/dedoping a lithium ion, metallic lithium, lithium-containing alloys, silicon capable of being alloyed with lithium, silicon alloys, tin, tin alloys, germanium, germanium alloys, tin oxide capable of doping/dedoping a lithium ion, silicon oxide, transition metal oxides capable of doping/dedoping a lithium ion, transition metal nitrides capable of doping/dedoping a lithium ion, and mixtures of the aforementioned materials can be employed. Among these, the carbonaceous materials capable of doping/dedoping a lithium ion are preferable since they exhibit particularly excellent charge/discharge cycle characteristics. Examples of such carbonaceous materials include coke, carbon black, activated carbon, artificial graphite, natural graphite, and amorphous carbonaceous materials, and they may be formed of any of fibrous, spherical, potato and flake shapes. Further, a material formed by allowing a carbonaceous material to carry other negative electrode active material(s) on the surface or in the inside thereof may also be used. Examples of other negative electrode active materials to be carried include metallic lithium, lithium-containing alloys, silicon capable of being alloyed with lithium, silicon alloys, tin and tin alloys.

Further, the carbonaceous material is preferably one having a plane distance between the (002) planes of 0.340 nm or less as measured by X-ray analysis, and particularly preferably one having a true density of 1.70 g/cm$^3$ or more as well, since the energy density of batteries can be enhanced. As such materials, there can be mentioned graphite, highly crystalline carbonaceous material having properties similar to those of graphite, and materials formed by coating the surface of the aforementioned materials with a carbonaceous material having a low crystallinity.

The positive electrode contains a positive electrode active material. Examples of the positive electrode active material include iron sulfate, iron phosphate, iron sulfide, transition metal oxides or transition metal sulfides such as $MoS_2$, $TiS_2$, $MnO_2$ and $V_2O_5$, composite oxides composed of lithium and transition metal(s) such as $LiCoO_2$, $LiMnO_2$, $LiMn_2O_4$, $LiNiO_2$, $LiNi_xCo_{(1-x)}O_2$ (x is a number of from 0 to 1 including a decimal number), $LiNi_xCo_yMn_{(1-x-y)}O_2$ (x and y are numbers of from 0 to 1 including decimal numbers, wherein (x+y) is 1 or less), electroconductive polymer materials such as polyaniline, polythiophene, polypyrrole, polyacetylene, polyacene, dimercaptothiadiazole/polyaniline complex, fluorinated carbon and activated carbon. Among these, in particular, composite oxides composed of lithium and transition metal(s) are preferable for their excellent charge/discharge load characteristics and charge/discharge cycle characteristics. As composite oxides composed of lithium and transition metal(s), those having an electric potential of less than 4.3 V at a fully charged state in terms of metallic lithium have conventionally been used, but those having an electric potential of 4.3 V or more at a fully charged state in terms of metallic lithium can also be mentioned. The nonaqueous electrolyte solution of the invention is effective particularly in lithium secondary batteries employing a positive electrode active material having an electric potential of 4.3 V or more at a fully charged state in terms of metallic lithium. This is considered that the sultone compound represented by Formula 1 forms a protective film not only on a negative electrode but also on a positive electrode of a lithium secondary battery.

The positive electrode active material may be used alone, or in mixture of two or more kinds. For the purpose of reducing the reactivity of the material with an electrolyte solution, a coating layer of an oxide or fluoride may be provided on the surface. Since positive electrode active materials usually have insufficient electroconductivity, it is used along with a conductive assistant to constitute a positive electrode. Examples of the conductive assistant include carbonaceous materials such as carbon black, amorphous whisker carbon and graphite.

The separator according to the invention is a membrane that is arranged between a positive electrode and a negative electrode, and electrically insulates the electrodes from each other while transmitting lithium ions therethrough. Examples thereof include porous films that exhibit ionic conductivity when impregnated with an electrolyte, and films having ionic conductivity. The material for the porous film can be selected from various types according to purpose, and polyolefin, polyimide, polyvinylidene fluoride, polyester and the like can be mentioned.

The shape of the separator is not particularly limited, but is usually a porous film or a polymer electrolyte. When a porous film is used, it may be used as a single layer, or as a laminate of plural porous films. Further, it may be coated with a resin to impart thermal stability to the surface of the film. In the case where a film has ionic conductivity, a lithium salt may be dissolved in a polymer compound, or the film may be swollen with an electrolyte solution.

The lithium secondary battery of the invention may have various arbitrary shapes according to purposes, such as those of a cylinder, coin, square and film. The basic structure of these batteries is the same irrespective of the shapes thereof, and is such that a negative electrode and a positive electrode are facing to each other via a separator, and an electrolyte solution impregnates the whole structure thereof. As the materials for a negative electrode active material, a positive electrode active material and a separator that constitute each battery, the aforementioned ones can be employed in common.

For example, in the case of a lithium secondary battery having a cylindrical shape, a negative electrode formed by applying a negative electrode active material onto a negative electrode current collector such as a copper foil, and a positive electrode formed by applying a positive electrode active material onto a positive electrode current collector such as an aluminum foil, are rolled up interleaving a separator, and insulating plates are placed on upper and lower sides of the roll, respectively. After putting the roll in a battery can, a nonaqueous electrolyte solution is infused therein. The can is covered with a sealing having a current contact that is deformed and cut when the internal pressure of the battery increases, and an element whose electric resistance is raised when the temperature of the battery increases, and then the end portion of the battery can is caulked to give a battery in a cylindrical form.

In the case of a coin-shaped lithium secondary battery, a disk-shaped negative electrode, a separator into which a nonaqueous electrolyte solution has been infused, a disk-shaped positive electrode, and as necessary, a spacer plate made of stainless steel, aluminum or the like are stacked in this order in a coin-shaped battery can, and then the battery can is caulked from the upper and lower sides thereof via a gasket of an insulating material, thereby giving a coin-shaped secondary battery.

EXAMPLES

Hereinafter, the present invention will be described in more detail by referring to the following examples, but the invention is not limited in any way by these examples.

The test methods of respective tests employed in the examples are as shown below. A coin-shaped battery was used as a testing battery.

<Evaluation of Load Characteristics of a Battery>
Load Characteristics Test 1

Figure 1:
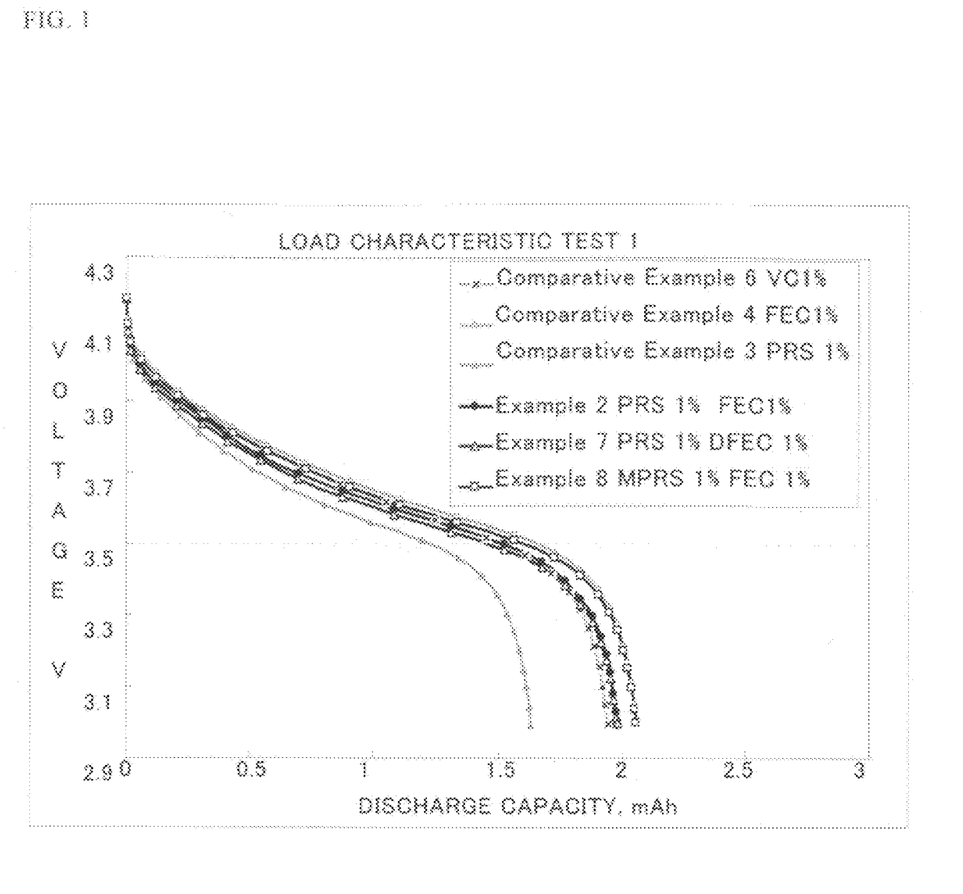
FIG. 1 is a drawing showing the result of load characteristics test 1.

A testing battery was charged in conditions of a constant current of 3 mA and a constant voltage of 4.2 V, and then discharged at 10 mA. At this point, the discharge capacity and voltage were measured. Obtained results are shown in FIG. 1.

Load Characteristics Test 2

Figure 2:
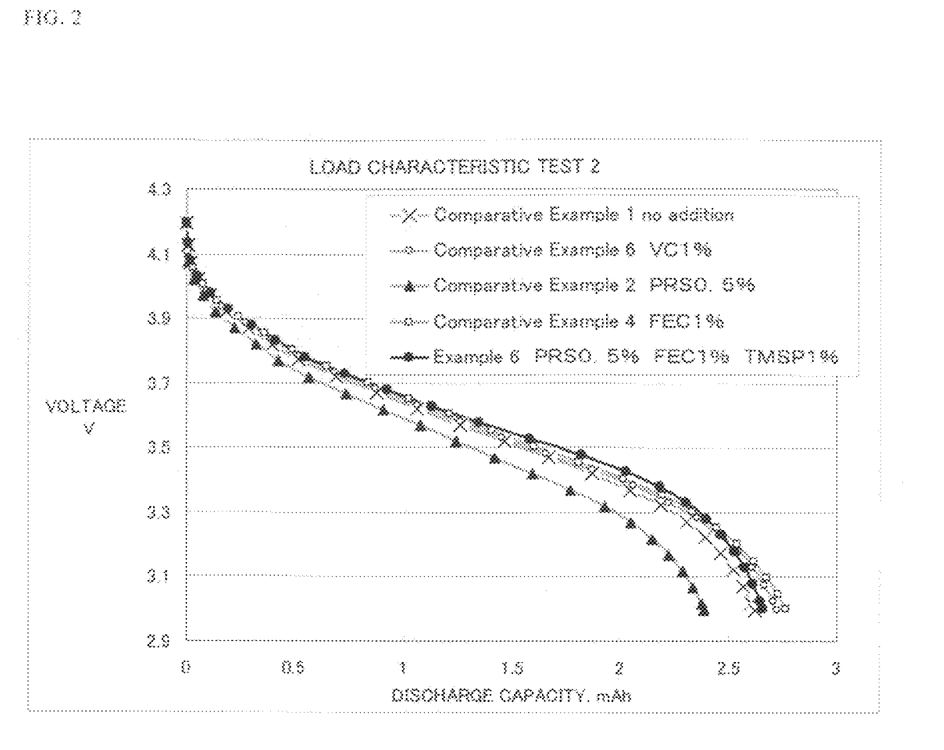
FIG. 2 is a drawing showing the result of load characteristics test 2.

A testing battery was charged under conditions of a constant current of 3 mA and a constant voltage of 4.2 V, and then discharged at 8 mA. At this point, the discharge capacity and voltage were measured. Obtained results are shown in FIG. 2.

<Evaluation of Charge/Discharge Cycle Characteristics of a Battery at High Temperature>

Figure 3:
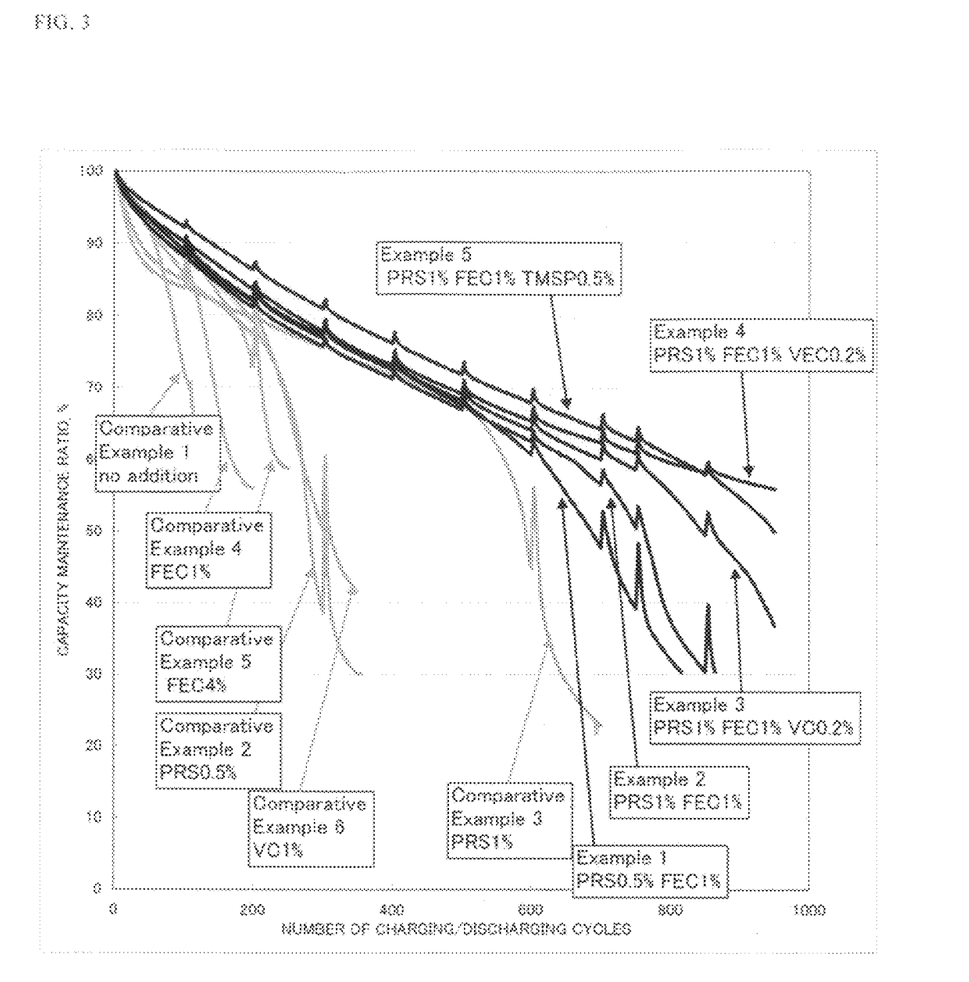
FIG. 3 is a drawing showing the result of charge/discharge cycle test.

A testing battery was placed in a constant temperature chamber at 50° C. and tested. Cycles of charge/discharge were repeated according to the conditions that the battery was charged at a constant current of 3.5 mA and at a constant voltage of 4.3 V, and then discharged at 3.5 mA. The electric potential of the positive electrode when the battery was charged to the voltage of 4.3 V was 4.38 V in terms of metallic lithium. In addition, at every 100 cycles, charging and discharging were performed in such a manner that the battery was charged in conditions of a constant current of 3.5 mA and a constant voltage of 4.3 V and then discharged at 1 mA. The discharge capacity (capacity preserving rate (%)), where the discharge capacity at the third cycle of each battery is defined as 100, is shown in FIG. 3 in relation to the number of charge/discharge cycles.

Example 1

Preparation of a Nonaqueous Electrolyte Solution

Ethylene carbonate (EC) and ethyl methyl carbonate (EMC) were mixed at a ratio of 4:6 (weight ratio) to form a nonaqueous solvent, LiPF$_6$ as an electrolyte was dissolved therein, and the concentration of the electrolyte was adjusted to 1 mol/l. To this solution, 1,3-prop-1-ene sultone as a sultone compound, and 4-fluoroethylene carbonate as an ethylene carbonate having a hydrogen atom substituted by a fluorine atom were added so that the contents thereof were adjusted to 0.5 weight % and 1 weight %, respectively, with respect to the total amount of the nonaqueous electrolyte solution.

<Preparation of a Negative Electrode>

20 parts by weight of artificial graphite (SFG6, manufactured by TIMCAL), 80 parts by weight of natural graphite-based graphite (GDR, manufactured by MITSUI MINING CO., LTD.), 1 part by weight of carboxymethylcellulose and 2 parts by weight of SBR latex were formed into a paste with a water medium, and the paste was kneaded to prepare a negative electrode-mixture slurry. Next, the negative electrode-mixture slurry was applied onto a negative electrode current collector made of a belt-shaped copper foil having a thickness of 18 μm and dried, which was then compressed with a roll press to give a negative electrode sheet. The negative electrode active material layer at this time had a coating density of 10 mg/cm$^2$ and a packing density of 1.5 g/ml.

<Preparation of a Positive Electrode>

90 parts by weight of LiCoO$_2$ (manufactured by HONJO FMC ENERGY SYSTEMS, INC.), 5 parts by weight of acetylene black and 5 parts by weight of polyvinylidene fluoride were formed into a paste using N-methyl-pyrrolidinone as a medium, and the paste was kneaded to prepare a positive electrode-mixture slurry. Next, the positive electrode-mixture slurry was applied onto a positive electrode current collector made of a belt-shaped aluminum foil having a thickness of 20 μm and dried, which was then compressed with a roll press to give a positive electrode sheet. The positive electrode active material layer at this time had a coating density of 30 mg/cm$^2$ and a packing density of 3.3 g/ml.

<Preparation of a Coin-Shaped Battery>

Coin-shaped electrodes were obtained by punching out the aforementioned negative electrode in the form of a disk having a diameter of 14 mm, and by punching out the aforementioned positive electrode in the form of a disk having a diameter of 13 mm. A separator was obtained by punching out a finely porous polyethylene film having a thickness of 25 μm in the form of a disk having a diameter of 17 mm to give a separator.

The obtained negative electrode, separator and positive electrode were stacked in this order in a stainless steel battery can (2032 size), and 20 μl of the nonaqueous electrolyte solution was poured into the can to impregnate the separator, positive electrode and negative electrode. Further, an aluminum plate (thickness: 1.2 mm, diameter: 16 mm) and a spring were put on the positive electrode, and the lid of the battery can was caulked via a polypropylene gasket to seal the battery, thereby forming a coin-shaped battery having a diameter of 20 mm and a height of 3.2 mm. The coin-shaped battery was charged at a constant current of 0.5 mA and a constant voltage of 3.8 V, and thereafter the battery was stored at 60° C. for 12 hours to obtain a testing battery.

Evaluation of the charge/discharge cycle characteristics at high temperature of the obtained testing battery was conducted.

Example 2

A testing battery was obtained in the same way as in Example 1, except that the contents of 1,3-prop-1-ene sultone and 4-fluoroethylene carbonate were adjusted to 1 weight %, respectively, with respect to the total amount of the nonaqueous electrolyte solution. Evaluations of the load characteristics test 1 and the charge/discharge cycle characteristics at high temperature of the obtained testing battery were conducted.

Example 3

A testing battery was obtained in the same way as in Example 1, except that 0.2 weight % of vinylene carbonate was contained, in addition to 1 weight % of 1,3-prop-1-ene sultone and 1 weight % of 4-fluoroethylene carbonate, with respect to the total amount of the nonaqueous electrolyte solution. Evaluation of the charge/discharge cycle characteristics at high temperature of the obtained testing battery was performed.

Example 4

A testing battery was obtained in the same way as in Example 1, except that 0.2 weight % of vinyl ethylene carbonate was contained, in addition to 1 weight % of 1,3-prop-1-ene sultone and 1 weight % of 4-fluoroethylene carbonate, with respect to the total amount of the nonaqueous electrolyte solution. Evaluation of the charge/discharge cycle characteristics at high temperature of the obtained testing battery was performed.

Example 5

A testing battery was obtained in the same way as in Example 1, except that 0.5 weight % of tris(trimethylsilyl)phosphate was contained, in addition to 1 weight % of 1,3-prop-1-ene sultone and 1 weight % of 4-fluoroethylene carbonate, with respect to the total amount of the nonaqueous electrolyte solution. Evaluation of the charge/discharge cycle characteristics at high temperature of the obtained testing battery was performed.

Example 6

A testing battery was obtained in the same way as in Example 1, except that 1 weight % of tris(trimethylsilyl)phosphate was contained, in addition to 0.5 weight % of 1,3-prop-1-ene sultone and 1 weight % of 4-fluoroethylene carbonate, with respect to the total amount of the nonaqueous electrolyte solution. Evaluation of the load characteristics test 2 of the obtained testing battery was performed.

Example 7

A testing battery was obtained in the same way as in Example 1, except that the content of 1,3-prop-1-ene sultone was adjusted to 1 weight %, and 1 weight % of 4,5-difluoroethylene carbonate was used in place of 4-fluoroethylene carbonate, with respect to the total amount of the nonaqueous electrolyte solution. Evaluation of the load characteristics test 1 of the obtained testing battery was performed.

Example 8

A testing battery was obtained in the same way as in Example 1, except that 1 weight % of 2-methyl-1,3-prop-1-ene sultone was used in place of 1,3-prop-1-ene sultone, in addition to 1 weight % of 4-fluoroethylene carbonate, with respect to the total amount of the nonaqueous electrolyte solution. Evaluation of the load characteristics test 1 of the obtained testing battery was performed.

Comparative Example 1

A testing battery was obtained in the same way as in Example 1, except that 1,3-prop-1-ene sultone and 4-fluoroethylene carbonate were not contained in the nonaqueous electrolyte solution. Evaluations of the load characteristics test 2 and charge/discharge cycle characteristics at high temperature of the obtained testing battery were performed.

Comparative Example 2

A testing battery was obtained in the same way as in Comparative Example 1, except that 0.5 weight % of 1,3-prop-1-ene sultone was contained with respect to the total amount of the nonaqueous electrolyte solution. Evaluations of the load characteristics test 2 and charge/discharge cycle characteristics at high temperature of the obtained testing battery were performed.

Comparative Example 3

A testing battery was obtained in the same way as in Comparative Example 1, except that 1 weight % of 1,3-prop-1-ene sultone was contained with respect to the total amount of the nonaqueous electrolyte solution. Evaluations of the load characteristics test 1 and charge/discharge cycle characteristics at high temperature of the obtained testing battery were performed.

Comparative Example 4

A testing battery was obtained in the same way as in Comparative Example 1, except that 1 weight % of 4-fluoroethylene carbonate was contained with respect to the total amount of the nonaqueous electrolyte solution. Evaluations of the load characteristics test 1, load characteristics test 2 and charge/discharge cycle characteristics at high temperature of the obtained testing battery were performed.

Comparative Example 5

A testing battery was obtained in the same way as in Comparative Example 1, except that 4 weight % of 4-fluoroethylene carbonate was contained with respect to the total amount of the nonaqueous electrolyte solution. Evaluations of the charge/discharge cycle characteristics at high temperature of the obtained testing battery were performed.

Comparative Example 6

A testing battery was obtained in the same way as in Comparative Example 1, except that 1 weight % of vinylene carbonate was contained with respect to the total amount of the nonaqueous electrolyte solution. Evaluations of the load characteristics test 1, load characteristics test 2 and charge/discharge cycle characteristics at high temperature of the obtained testing battery were performed.

Details of the compounds that were added to the nonaqueous electrolyte solutions used in the tests are shown in Table 1. The abbreviations shown in Table 1 indicate the following compounds. The numerals indicate the contained amounts in weight % with respect to the total amount of the nonaqueous electrolyte solution, and the symbols "-" represent that the corresponding compounds were not contained.

PRS: 1,3-prop-1-ene sultone
MPRS: 2-methyl-1,3-prop-1-ene sultone
FEC: 4-fluoroethylene carbonate
DFEC: 3,4-difluoro ethylene carbonate
VC: vinylene carbonate
VEC: vinyl ethylene carbonate
TMSP: tris(trimethylsilyl) phosphate

TABLE 1

| | PRS | MPRS | FEC | DFEC | VC | VEC | TMSP |
|---|---|---|---|---|---|---|---|
| Example 1 | 0.5 | — | 1 | — | — | — | — |
| Example 2 | 1 | — | 1 | — | — | — | — |
| Example 3 | 1 | — | 1 | — | 0.2 | — | — |
| Example 4 | 1 | — | 1 | — | — | 0.2 | — |
| Example 5 | 1 | — | 1 | — | — | — | 0.5 |
| Example 6 | 0.5 | — | 1 | — | — | — | 1 |
| Example 7 | 1 | — | — | 1 | — | — | — |
| Example 8 | — | 1 | 1 | — | — | — | — |
| Comp. Ex. 1 | — | — | — | — | — | — | — |
| Comp. Ex. 2 | 0.5 | — | — | — | — | — | — |
| Comp. Ex. 3 | 1 | — | — | — | — | — | — |
| Comp. Ex. 4 | — | — | 1 | — | — | — | — |
| Comp. Ex. 5 | — | — | 4 | — | — | — | — |
| Comp. Ex. 6 | — | — | — | — | 1 | — | — |

The cases where PRS alone was added to the nonaqueous electrolyte solution (Comparative Examples 2 and 3) showed less degradation in the charge/discharge cycle test, as compared with the cases where no compound was added to the nonaqueous electrolyte solution (Comparative Example 1), FEC alone was added (Comparative Examples 4 and 5) and VC alone was added (Comparative Example 6) (FIG. 3). On the other hand, the discharge voltage and discharge capacity were low (FIGS. 1 and 2).

The cases where PRSs (PRS, MPRS) and FECs (FEC, DFEC) were added to the nonaqueous electrolyte solution (Examples 2, 7 and 8) showed a higher discharge voltage and a higher discharge capacity (FIG. 1), and the degradation in the charge/discharge cycle test were less (FIG. 3), as compared with the cases where PRS alone was added (Comparative Examples 2 and 3). In particular, the case where MPRS and FEC were added (Example 8) showed a high discharge voltage (FIG. 1). The same as those in the case where PRS and FEC were added also apply to the cases where three kinds of PRS, FEC and TMSP were added to the nonaqueous electrolyte solution (Examples 5 and 6) (FIGS. 2 and 3). Further, in particular, the degradations in the charge/discharge cycle test in these cases were less (FIG. 3).

It is considered that by adding PRS and FEC to the nonaqueous electrolyte solution, increase in the internal resistance of the battery caused by PRS is suppressed. In this regard, it is known that the lowering of the capacity preserving rate at an early stage, after several tens of cycles, of the charge/discharge cycle test is generated from a phenomenon that the rate of utilizing the electrode active material becomes uneven in the electrode, and that such a lowering correlates with the internal resistance of the battery. FIG. 3 shows that the electrolyte solution in Example 5 has a particularly low and favorable internal resistance.

Further, it is also understood that the degradation in the charge/discharge cycle test is small in the cases where a slight amount of cyclic carbonate having a carbon-carbon double bond such as VC or VEC is further added to the nonaqueous electrolyte containing PRS and FEC.

The invention claimed is:

1. A nonaqueous electrolyte solution comprising a nonaqueous solvent, an electrolyte, a sultone compound represented by the Formula 1 below at 0.1% by weight to 3% by weight, an ethylene carbonate having a hydrogen atom substituted by a fluorine atom at 0.1% by weight to 5% by weight, and a cyclic carbonate having a carbon-carbon unsaturated bond at 0.01 to 1 weight %, Formula 1 wherein, in Formula 1: $R_1$ to $R_4$ each independently represent a hydrogen atom, a fluorine atom, or a hydrocarbon group with 1 to 12 carbon atoms that may contain fluorine atom(s); n represents an integer of 0 to 3; and when n is 2 or 3, the two or three $R_3$ groups are independent from each other and two or three $R_4$ groups are independent from each other.

2. The nonaqueous electrolyte solution according to claim 1, wherein the sultone compound is 1,3-prop-1-ene sultone and/or methyl-1,3-prop-1-ene sultone.

3. The nonaqueous electrolyte solution according to claim 1, wherein the ethylene carbonate having a hydrogen atom substituted by a fluorine atom is 4-fluoroethylene carbonate and/or 4,5-difluoroethylene carbonate.

4. The nonaqueous electrolyte solution according to claim 1, further comprising a silyl phosphate at 0.01 to 2 weight %.

5. The nonaqueous electrolyte solution according to claim 1, wherein the electrolyte is a lithium salt.

6. A lithium secondary battery comprising the nonaqueous electrolyte solution according to claim 1.

\* \* \* \* \*